(No Model.)

H. S. WILLIAMS.
BICYCLE.

No. 503,513. Patented Aug. 15, 1893.

Witnesses,

Inventor,
Henry S. Williams
By Dewey & Co.
Attys

UNITED STATES PATENT OFFICE.

HENRY S. WILLIAMS, OF MADERA, CALIFORNIA.

BICYCLE.

SPECIFICATION forming part of Letters Patent No. 503,513, dated August 15, 1893.

Application filed March 6, 1893. Serial No. 464,876. (No model.)

*To all whom it may concern:*

Be it known that I, HENRY S. WILLIAMS, a citizen of the United States, residing at Madera, Fresno county, State of California, have invented an Improvement in Bicycles; and I hereby declare the following to be a full, clear, and exact description of the same.

My invention relates to the general class of bicycles, tricycles, and other vehicles of the velocipede type.

It consists in the novel construction and arrangement of parts hereinafter fully described and specifically claimed.

Figure 1:
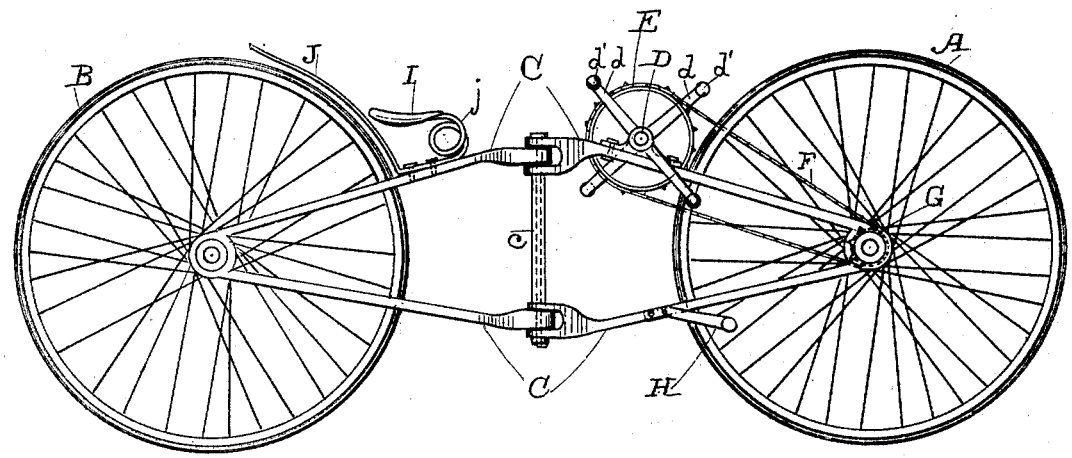
Figure 2:
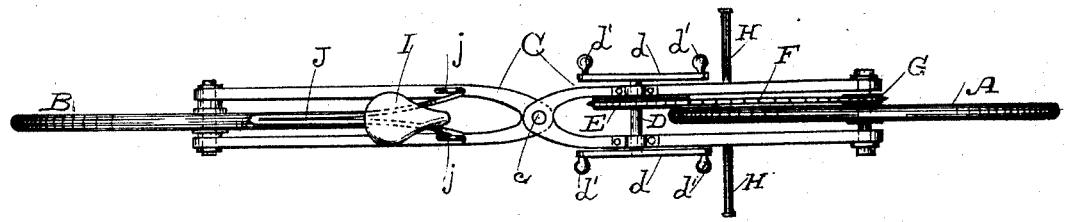

Referring to the accompanying drawings for a more complete explanation of my invention,—Figure 1 is a side elevation of my bicycle. Fig. 2 is a plan of the same.

A is the front wheel.

B is the rear wheel, and C is the connecting frame. This frame is made in two sections, the adjacent ends of which are connected together by a suitable hinge joint at $c$, and the extremities of said sections are suitably connected with the wheel axles.

Upon the forward section of the frame, at a point somewhat in advance of its hinge connection with the rear section, is mounted the shaft D, which has upon it the series of cranks $d$ with handles or knobs $d'$ which are to be grasped by the hands of the rider. Upon this same shaft is a sprocket-wheel E from which an endless chain F extends forwardly to a sprocket-wheel G on the axle of the front wheel A.

On the lower portion of the forward section of the frame C are secured, one on each side, the foot-rests H, and these lie in planes forward of the vertical plane of the driving shaft D.

On the upper portion of the rear section of the frame C is secured the saddle I, back of which rises a flexible arm or plate J which normally lies over and out of contact with the rim of the rear wheel B. This plate serves as a combined guard and brake, this latter office being called into play by the rider throwing his body backwardly against it and pressing it against the wheel.

In practice it may be well to construct the spring $j$ upon which the saddle rests of a coiled and doubled spring rod having for its rear extension an arm or plate J.

It is to be noted that the relative positions of the foot-rests H and the cranks $d$ of the driving shaft D, are such that the rider seated upon the saddle I, with his legs extending forwardly and downwardly to the foot rests, is enabled to pull up with his hands on the several cranks successively, said pull being in a line with the strain of his legs, whereby he is enabled to exert not only the full force of his arms, but also the power of his back and extended legs, thereby utilizing the entire power of his body to an advantage. The driving shaft and the foot-rests being in advance of the hinge connection between the frame sections, enables the rider to accurately steer and guide the machine by the movements of both his hands and feet or of either.

Having thus described my invention, what I claim as new, and desire to secure by Letters Patent, is—

1. In a bicycle or similar vehicle, the combination of wheels, a hinged frame connecting the wheels, a saddle supported thereby and a yielding plate immediately behind the saddle and over the rim of the rear wheel, serving as a combined guard and brake, substantially as herein described.

2. In a bicycle or similar vehicle, the combination of wheels, connecting frame, saddle supported thereby and a yielding plate immediately behind the saddle and over the rim of the rear wheel, serving as a combined guard and brake, substantially as herein described.

In witness whereof I have hereunto set my hand.

HENRY S. WILLIAMS.

Witnesses:
  S. H. NOURSE,
  GEO. H. STRONG.